United States Patent [19]

Wertenbach et al.

[11] Patent Number: 5,515,691
[45] Date of Patent: May 14, 1996

[54] MOTOR VEHICLE WITH AN AIR-CONDITIONING SYSTEM

[75] Inventors: Jürgen Wertenbach, Fellbach; Günter Abersfelder, Sindelfingen, both of Germany

[73] Assignee: Mercedes-Benz AG, Stuttgart, Germany

[21] Appl. No.: 414,111

[22] Filed: Mar. 31, 1995

[30] Foreign Application Priority Data

Mar. 31, 1994 [DE] Germany ............ 44 11 281.5

[51] Int. Cl.⁶ .................. B60H 1/32; A62C 3/07
[52] U.S. Cl. .............. 62/133; 62/323.1; 169/62
[58] Field of Search ............ 62/133, 132, 498, 62/323.1; 169/62

[56] References Cited

U.S. PATENT DOCUMENTS

| | | | |
|---|---|---|---|
| 3,387,662 | 6/1968 | Molgano, Jr. .......... | 169/62 X |
| 3,876,011 | 4/1975 | Poitras ................. | 169/62 X |
| 4,248,309 | 2/1981 | Hofle et al. ............ | 169/47 |
| 5,402,967 | 4/1995 | Hughes ................. | 169/62 X |

FOREIGN PATENT DOCUMENTS

| | | |
|---|---|---|
| 0487445A1 | 5/1992 | European Pat. Off. . |
| 8715208 | 4/1988 | Germany . |
| 3738843A1 | 5/1989 | Germany . |
| 4207859A1 | 9/1993 | Germany . |
| WO90/07683 | 7/1990 | WIPO . |

OTHER PUBLICATIONS

Patent Abstracts of Japan, vol. 16, No. 443 (C–0985), Sep. 16, 1992 JPA04154887 (Watabe Koichi).
DataBase WPI, Week 4691, Derwent Publications Ltd., London, GB; AN 91 339797 & WOA9116390 (DuPont De Nemours U CoE I).
Patent Abstracts of Japan, vol. 1 No. 39 (M–015) Apr. 20, 1977 & JPA51146796 (Toshiaba Corp.).
European Search Report Jul. 14, 1995 Europe.

*Primary Examiner*—William E. Wayner
*Attorney, Agent, or Firm*—Evenson McKeown Edwards & Lenahan

[57] ABSTRACT

The invention relates to a motor vehicle with an air-conditioning system which contains an environmentally compatible, non-flammable and non-toxic circulating medium. In order to avoid any risk to the vehicle occupants in a vehicle crash as a result of fire breaking out, it is proposed that the circulating medium be used as an extinguishing medium in the event of a fire breaking out on the motor vehicle.

13 Claims, 1 Drawing Sheet

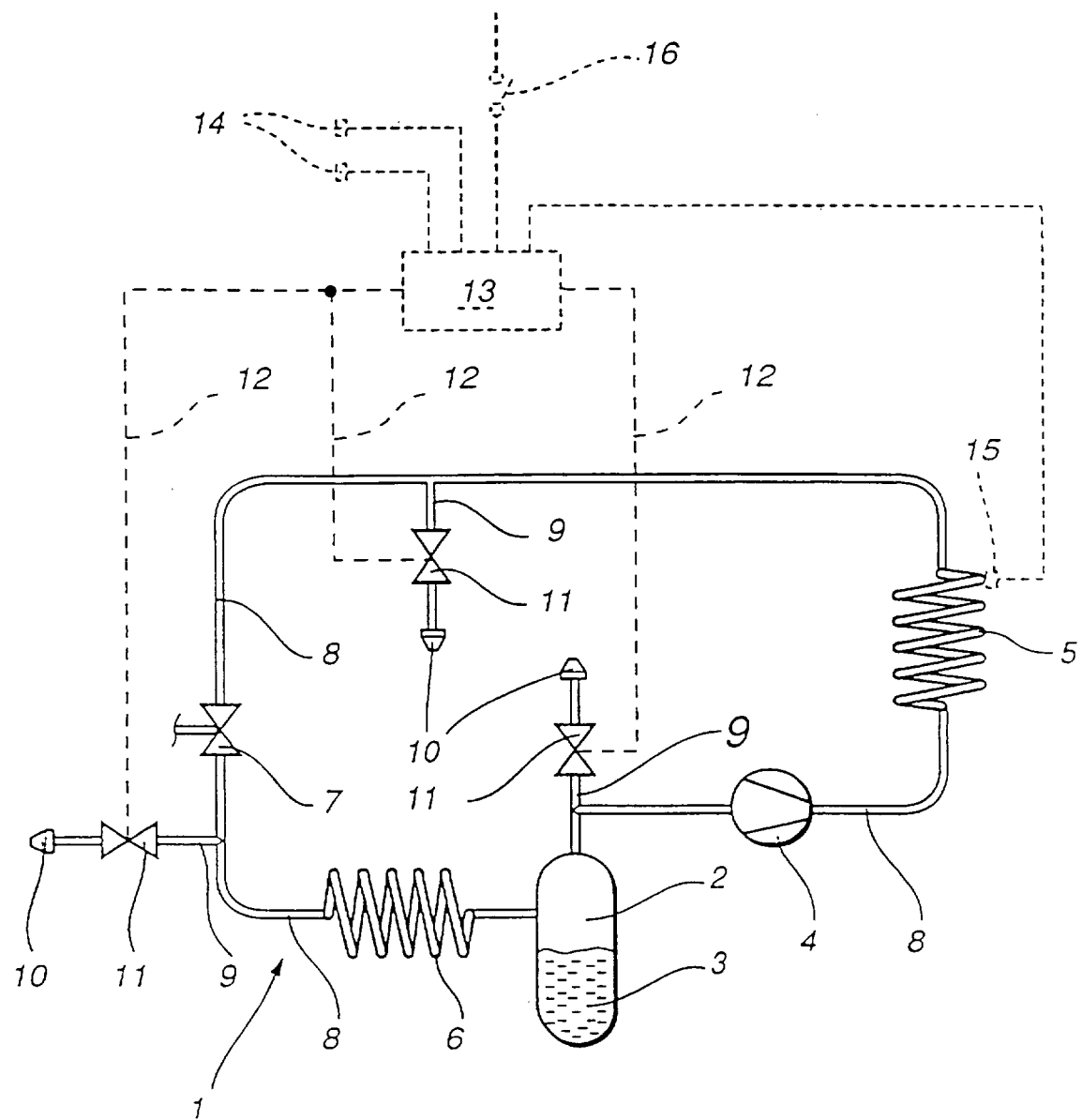

MOTOR VEHICLE WITH AN AIR-CONDITIONING SYSTEM

BACKGROUND AND SUMMARY OF THE INVENTION

The invention relates to a motor vehicle with an air-conditioning system which contains an environmentally compatible, non-flammable and non-toxic circulating medium.

For the air-conditioning of the passenger compartment of motor vehicles, use has hitherto been made of compression systems which contain fluorocarbons or chlorofluorocarbons as the circulating medium. From the standpoint of environmental compatibility, more and more emphasis is being placed on the search for alternative media which make very little contribution, if any, to a greenhouse effect. A compression system containing $CO_2$ as the circulating medium is economical and environmentally neutral. Because of the high vapor pressures of $CO_2$, a modified system technology and more pressure-resistant system components are necessary as compared with previous systems. Such systems are known, for example, from PCT patent application number WO 90/07683. In the event of traffic accidents, however, because of the high pressure level of $CO_2$ in the circuit of the air-conditioning system, uncontrolled escape of $CO_2$ may occur if system is damaged, which can result in a health hazard, especially to those within the vehicle.

In the event of any fire occurring and/or being caused by traffic accidents, especially in the engine compartment, fire extinguishing systems are provided for the motor vehicle, as are known for example from German Patent Document No. DE-GM 87 15 208.8. In that publication, the extinguishing system contains a container for the extinguishing agent and extinguishing lines which are guided to potential fire-hazard points in the engine compartment. Extinguishing takes placed, when needed, via crash or temperature sensors but can also be triggered manually. A special sensor system for this purpose has been disclosed in detail in European Patent Document EP-OS 487 445. Such extinguishing agent systems represent a substantial additional weight for the total weight of the vehicle, which entails an increased fuel consumption. Moreover, the extinguishing agent container occupies additional structural space which, especially in the case of small vehicles, is not available to a sufficient extent to permit the accommodation of such an extinguishing system.

An object of the invention is further to develop a motor vehicle of the generic type so that, in the event of a vehicle crash, a hazard to the occupants as a result of fire breaking out is avoided.

This object is achieved, according to the preferred embodiments of the invention, by utilizing the circulating medium as a fire extinguishing medium in the event of a fire breaking out in the motor vehicle.

By means of the invention, the circulating medium in the air-conditioning system is selectively utilized, when needed, in a simple manner and with economy of structural space as a fire extinguishing agent, or the air-conditioning system is used as a fire extinguishing sprinkler, there being no need for a separate store of extinguishing agent. In this arrangement, the extinguishing agent lines and the nozzles which terminate at the possible seats of fire represent only an insignificant additional weight for the vehicle. In the event of a crash and/or fire, a sensor system initiates an automatic fire extinguishing procedure, the emerging circulating medium, with fire-extinguishing capability, forcing out from the fire-hazard areas the atmospheric oxygen which is involved in originating and sustaining of the fire. Thus, controlled emergence of the circulating medium is possible both preventively, in order to avoid fire and fire injuries, and also actively to extinguish the fire at an existing source of fire, so that overall any danger to the vehicle occupants in the event of fire is avoided.

Other objects advantages and novel features of the present invention will become apparent from the following detailed description of the invention when considered in conjunction with the accompanying drawings.

BRIEF DESCRIPTION OF THE DRAWINGS

The single drawing FIGURE schematically depicts a circuit of an air-conditioning system for a motor vehicle with sensor-controlled extinguishing agent lines constructed according to a preferred embodiment of the invention.

DETAILED DESCRIPTION OF THE DRAWINGS

Arranged in a closed circuit 1 of a motor vehicle air-conditioning system is a storage container 2 which contains an environmentally compatible, non-flammable, non-toxic circulating medium 3, such as for example $CO_2$. Container 2 is situated on the low-pressure side of a compressor 4 which is directly connected to it and driven by the vehicle engine. The compressor 4 is connected on its high-pressure side to a condenser 5 located upstream of the engine cooler. Condenser 5 is connected to a vaporizer 6 arranged in a ventilator unit of the engine and connected to the storage container 2. Downstream of the condenser 5 and upstream of the vaporizer 6, an expansion valve 7 is interposed in the circuit 1, by which valve 7 the circulating medium passing through depressurized or let down, cooled and passed to the vaporizer 6.

The individual components 2, 4, 5, 6, 7 of the air-conditioning system are connected to each other in the circuit 1 by pressure lines 8, from which fire-extinguishing lines 9 branch off. The lines 9 end at fire-hazard points in the engine compartment of the motor vehicle, where they have extinguishing nozzles 10. Solenoid valves 11 are arranged in the fire extinguishing lines 9 and are connected via control lines 12 to an electronic control unit 13.

In the control unit 13, electrical signals from sensors 14 are processed, some or all of the solenoid valves 11 being controlled to open by the sensors in the case of a crash and/or fire. The sensors 14 may be crash sensors, which are expediently constituted by the crash sensors for airbags and/or belt tighteners, or are arranged separately from the latter. Moreover, some of the sensors 14 can also consist of fire sensors arranged locally at certain possible sources of fire and acting in the manner of temperature sensors.

Deformation sensors 15 can also be attached to the individual components of the air-conditioning system, these reacting to damage to the air-conditioning system by controlling the extinguishing nozzles 10 to open, via the control unit 13. It is also conceivable to make use of sensors which, for example, signal an excessive superatmospheric pressure in the circuit in the event of fire or can detect a leakage in case of damage as a result of a pressure drop in the circuit and then optionally initiate an extinguishing process. Furthermore, a manually operated switch 16 is provided, by means of which the vehicle occupant has the option of independently controlling the valves 11 to open.

If, then, the danger of a fire or an uncontrolled escape of $CO_2$ from the air-conditioning system occurs in the event of an accident, the solenoid valve 11 are controlled to open via the control unit 13, via the sensors 14, 15 or the actuation of the switch 16 or via the deformation sensors 15, so that $CO_2$ from the circuit 1 of the air-conditioning system can emerge in a controlled and non-hazardous manner from the extinguishing nozzles 10 and can selectively extinguish the fire, or readily flammable areas such as the injection and ignition system on the engine block can be preventively sprayed. It is a precondition here that the circulating medium in the air-conditioning system should, like $CO_2$, be capable of extinguishing a fire. At the same time, the pressurized $CO_2$ circuit of the air-conditioning system is depressurized in a locally controlled manner, the $CO_2$ gases being led into the areas in which they are non-hazardous for the vehicle occupants, so that there is no danger of suffocation. Preferably, take air-conditioning system is emptied, so that atmospheric pressure is obtained in the circuit, so that in the event of any damage to the air-conditioning system there is no risk of explosion.

Furthermore, it is also contemplated by the invention to design the valves, which in this case are constituted by the solenoid valves 11, so that in the event of an increased superatmospheric pressure, they are forced open by the said pressure for the emergence of $CO_2$. Finally, extinguishing nozzles 10 can be provide whereby even areas of the motor vehicle outside the engine compartment can be sprayed according to other preferred embodiments of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle with a vapor compression air-conditioning system which contains an environmentally compatible, non-flammable and non-toxic circulating medium, wherein the circulating medium is utilized as an extinguishing medium in the event of a fire breaking out in the motor vehicle.

2. Motor vehicle according to claim 1, wherein controllable extinguishing nozzles, connected to the circuit of the air-conditioning system, are arranged at fire-hazard points in the motor vehicle and can be indirectly controlled to open by at least one of local fire sensors and crash sensors.

3. Motor vehicle according to claim 2, wherein the fire-hazard points of the motor vehicle lie outside the passenger compartment.

4. Motor vehicle according to claim 2, wherein the extinguishing nozzles can additionally be controlled to open manually.

5. Motor vehicle according to claim 2, wherein at least one of the extinguishing nozzles can additionally be controlled to open by a superatmospheric pressure, caused by fire heat in the circuit of the air-conditioning system.

6. Motor vehicle according to claim 1, wherein the circulating medium is $CO_2$.

7. Motor vehicle according to claim 1, wherein said air-conditioning system includes a condenser, a compressor, and a vaporizer forming parts of the air-conditioner circuit for the circulating medium.

8. Motor vehicle vapor compression air-conditioning system, comprising:

a pressurized coolant circulating circuit for circulating an environmentally compatible, non-flammable and non-toxic circulating coolant medium, at least one fire control nozzle opening to a vehicle fire hazard location, and a fire control circuit selectively connecting the coolant circulating circuit with the at east one fire control nozzle to thereby supply said coolant as a fire extinguishing medium.

9. Motor vehicle air conditioning system according to claim 8, wherein said fire control circuit includes:

at least one controllable valve disposed upstream of a respective one of the fire control nozzles, and a signal generator for generating a signal for opening of said at least one controllable valve in dependence on a detected vehicle fire.

10. Motor vehicle according to claim 9, wherein said signal generator is a vehicle operator operable manual switch.

11. Motor vehicle according to claim 9, wherein said signal generator is an electronic control circuit containing at least one vehicle crash sensor.

12. Motor vehicle according to claim 8, wherein the circulating coolant medium is $CO_2$.

13. Motor vehicle air-conditioning system according to claim 8, wherein said air-conditioning system includes a condenser, a compressor, and a vaporizer forming parts of the air-conditioner circuit for the circulating medium.

* * * * *